United States Patent
Liu et al.

(10) Patent No.: US 11,201,870 B2
(45) Date of Patent: *Dec. 14, 2021

(54) USING COMMIT TOKENS TO COORDINATE PERMISSIONS SUBMISSIONS TO ADDRESS TRANSACTION CONFLICT IN BLOCKCHAIN SYSTEMS

(71) Applicant: Advanced New Technologies Co., Ltd., Grand Cayman (KY)

(72) Inventors: Zheng Liu, Hangzhou (CN); Lichun Li, Hangzhou (CN); Shan Yin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,897

(22) Filed: Mar. 15, 2021

(65) Prior Publication Data

US 2021/0211428 A1 Jul. 8, 2021

Related U.S. Application Data

(63) Continuation of application No. 16/779,189, filed on Jan. 31, 2020, now Pat. No. 10,999,283, which is a (Continued)

(30) Foreign Application Priority Data

Apr. 15, 2019 (CN) .................. 201910299016.X (51) Int. Cl.
*H04L 29/06* (2006.01)
*H04L 9/06* (2006.01)
*H04L 9/32* (2006.01)

(52) U.S. Cl.
CPC ............ *H04L 63/10* (2013.01); *H04L 9/0637* (2013.01); *H04L 9/3234* (2013.01)

(58) Field of Classification Search
CPC ...... H04L 63/10; H04L 9/3234; H04L 9/0637
(Continued)

(56) References Cited

U.S. PATENT DOCUMENTS 10,250,394 B1 * 4/2019 Borne-Pons ......... G06Q 20/223
10,250,395 B1   4/2019 Borne-Pons et al.
(Continued)

FOREIGN PATENT DOCUMENTS

CN   107682331   2/2018
CN   108011840   5/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Bryan F Wright
(74) *Attorney, Agent, or Firm* — Fish & Richardson P.C.

(57) ABSTRACT

Implementations of the present specification provide a computer-implemented method, computer-implemented system, and non-transitory, computer-readable medium. The computer-implemented method includes sending a token acquisition request by a blockchain client to a blockchain node. A commit token fed back from the blockchain node is received by the blockchain client, where the commit token indicates that the blockchain client has permission to submit transaction data to a specific data block in a blockchain. Transaction data is sent by the blockchain client to the blockchain node.

20 Claims, 9 Drawing Sheets

Related U.S. Application Data continuation of application No. PCT/CN2020/071173, filed on Jan. 9, 2020.

(58) Field of Classification Search
USPC .......................................................... 726/4
See application file for complete search history.

(56) References Cited

U.S. PATENT DOCUMENTS

| | | | |
|---|---|---|---|
| 10,425,230 B1* | 9/2019 | Tang | .................. H04L 9/0894 |
| 2002/0138471 A1 | 9/2002 | Dutta et al. | |
| 2017/0344987 A1 | 11/2017 | Davis | |
| 2018/0082291 A1* | 3/2018 | Allen | .................. H04L 9/3263 |
| 2018/0101848 A1 | 4/2018 | Castagna et al. | |
| 2018/0253745 A1* | 9/2018 | Webster | .................. G06Q 20/36 |
| 2018/0276662 A1 | 9/2018 | Zavesky et al. | |
| 2018/0293583 A1 | 10/2018 | Rhie et al. | |
| 2018/0349484 A1 | 12/2018 | Carlisle et al. | |
| 2019/0108518 A1 | 4/2019 | Asif et al. | |
| 2019/0378142 A1* | 12/2019 | Darnell | .................. G06F 21/645 |
| 2020/0013025 A1 | 1/2020 | Verma et al. | |
| 2020/0051078 A1* | 2/2020 | Manevich | .................. H04L 9/30 |

FOREIGN PATENT DOCUMENTS

| | | |
|---|---|---|
| CN | 108304486 | 7/2018 |
| CN | 108765240 | 11/2018 |
| CN | 108833464 | 11/2018 |
| CN | 109271245 | 1/2019 |
| CN | 109587177 | 4/2019 |
| CN | 110189121 | 8/2019 |
| TW | 201820199 | 6/2018 |
| WO | WO 2018126029 | 7/2018 |
| WO | WO 2019050527 | 3/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071173, dated Apr. 8, 2020, 16 pages (with partial machine translation).

* cited by examiner

FIG. 9

USING COMMIT TOKENS TO COORDINATE PERMISSIONS SUBMISSIONS TO ADDRESS TRANSACTION CONFLICT IN BLOCKCHAIN SYSTEMS

CROSS-REFERENCE TO RELATED APPLICATIONS

This application is a continuation of U.S. patent application Ser. No. 16/779,189, filed Jan. 31, 2020, which is a continuation of PCT Application No. PCT/CN2020/071173, filed on Jan. 9, 2020, which claims priority to Chinese Patent Application No. 201910299016.X, filed on Apr. 15, 2019, and each application is hereby incorporated by reference in its entirety.

TECHNICAL FIELD

Implementations of the present specification relate to the field of computer technologies, and in particular, to a data processing method and device, a blockchain client, and a blockchain node.

BACKGROUND

The blockchain technology is a distributed database technology. By using cryptography and a consensus mechanism, the blockchain technology ensures that data cannot be tampered with or forged. As computer and Internet technologies develop, the blockchain technology is popular due to its advantages of decentralization, openness and transparency, tamper-resistance, trustworthiness, etc. It has been widely used in numerous fields such as smart contract, securities transaction, e-commerce, the Internet of Things, social communication, file storage, proof of existence, identity verification, and equity crowdfunding.

In related technologies, a blockchain can be established between institutions based on the blockchain technology. Each institution can include one or more blockchain nodes in a blockchain network. Each institution can further include a plurality of blockchain clients, and the plurality of blockchain clients can share an institutional account of the institution in the blockchain. Each blockchain client of each institution can communicate with one or more blockchain nodes of the institution.

In the previous related technologies, the plurality of blockchain clients of the same institution separately send transaction data to the blockchain nodes of the institution. Because transaction data is processed in series in the blockchain, a transaction conflict can occur when the plurality of blockchain clients of the same institution concurrently send transaction data to the blockchain node (e.g., the plurality of blockchain clients of the same institution concurrently send transaction data to the same blockchain node or a plurality of blockchain nodes of the institution).

SUMMARY

An objective of implementations of the present specification is to provide a data processing method and device, a blockchain client, and a blockchain node, to alleviate a transaction conflict problem.

To achieve the previous objective, one or more implementations of the present specification provide the following technical solutions:

According to a first aspect of one or more implementations of the present specification, a blockchain-based data processing method is provided, where the method is applied to a blockchain client and includes the following: sending a token acquisition request to a blockchain node; receiving a commit token fed back by the blockchain node, where the commit token is used to indicate that the blockchain client has permission to submit transaction data to a specific data block; and sending transaction data to the blockchain node.

According to a second aspect of one or more implementations of the present specification, a blockchain-based data processing device is provided, where the device is applied to a blockchain client and includes the following: a first sending unit, configured to send a token acquisition request to a blockchain node; a receiving unit, configured to receive a commit token fed back by the blockchain node, where the commit token is used to indicate that the blockchain client has permission to submit transaction data to a specific data block; and a second sending unit, configured to send transaction data to the blockchain node.

According to a third aspect of one or more implementations of the present specification, a blockchain client is provided, where the blockchain client includes the following: one or more memories, configured to store a computer instruction; and one or more processors, configured to execute the computer instruction to implement the method steps according to the first aspect.

According to a fourth aspect of one or more implementations of the present specification, a blockchain-based data processing method is provided, where the method is applied to a blockchain node and includes the following: receiving a token acquisition request from a blockchain client; invoking a token allocation contract deployed in a blockchain to generate a commit token, where the commit token is used to indicate that the blockchain client has permission to submit transaction data to a specific data block, and the token allocation contract is used to coordinate allocation of the commit token among a plurality of blockchain clients of the same institution; and feeding back the commit token to the blockchain client.

According to a fifth aspect of one or more implementations of the present specification, a blockchain-based data processing device is provided, where the device is applied to a blockchain node and includes the following: a receiving unit, configured to receive a token acquisition request from a blockchain client; an invoking unit, configured to invoke a token allocation contract deployed in a blockchain to generate a commit token, where the commit token is used to indicate that the blockchain client has permission to submit transaction data to a specific data block, and the token allocation contract is used to coordinate allocation of the commit token among a plurality of blockchain clients of the same institution; and a feedback unit, configured to feed back the commit token to the blockchain client.

According to a sixth aspect of one or more implementations of the present specification, a blockchain node is provided, where the blockchain node includes the following: one or more memories, configured to store a computer instruction; and one or more processors, configured to execute the computer instruction to implement the method steps according to the fourth aspect.

As can be seen from the technical solutions provided in the previous implementations of the present specification, in some implementations of the present specification, the token allocation contract deployed in the blockchain is used to coordinate the submission permissions of the plurality of blockchain clients of the same institution, so as to prevent the plurality of blockchain clients of the same institution from concurrently sending transaction data to the blockchain node, thereby alleviating a transaction conflict problem.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following clearly describes the technical solutions in some implementations of the present specification with reference to the accompanying drawings in some implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

An example of a transaction conflict scenario in the previous related technologies can be as follows:

The transaction data usually includes a Nonce value of an institutional account. The Nonce value can be a random number or a pseudo-random number used to prevent a replay attack on a blockchain. One Nonce value can be used by only one piece of transaction data. Different transaction data includes different Nonce values. For example, Nonce values can be monotonically increasing in different transaction data.

Institution A can include blockchain clients BCclient-X1, BCclient-X2, BCclient-X3, and BCclient-X4; and can include blockchain nodes BCnode-A1 and BCnode-A2. The institutional account of institution A in the blockchain can be AccountA. The current Nonce value of the institutional account AccountA can be 100.

The blockchain client BCclient-X1 can construct transaction data TX1 with Nonce value 101 according to a format of transaction data in the blockchain. The blockchain client BCclient-X1 can send the transaction data TX1 to the blockchain node BCnode-A1. Because the plurality of blockchain clients of the same institution separately send transaction data to the blockchain node of the institution, when the blockchain client constructs the transaction data TX1, the blockchain client BCclient-X2 can construct transaction data TX2 with Nonce value 101 according to the format of the transaction data in the blockchain. The blockchain client BCclient-X2 can send the transaction data TX2 to the blockchain node BCnode-A2. Because the transaction data TX1 and the transaction data TX2 include the same Nonce value, the blockchain fails to check the Nonce value in a later process, causing a transaction conflict. For example, when the blockchain processes the transaction data TX1 before processing the transaction data TX2, the processing of the transaction data TX2 fails. Alternatively, when the blockchain processes the transaction data TX2 before processing the transaction data TX1, the processing of the transaction data TX1 fails.

Figure 1:
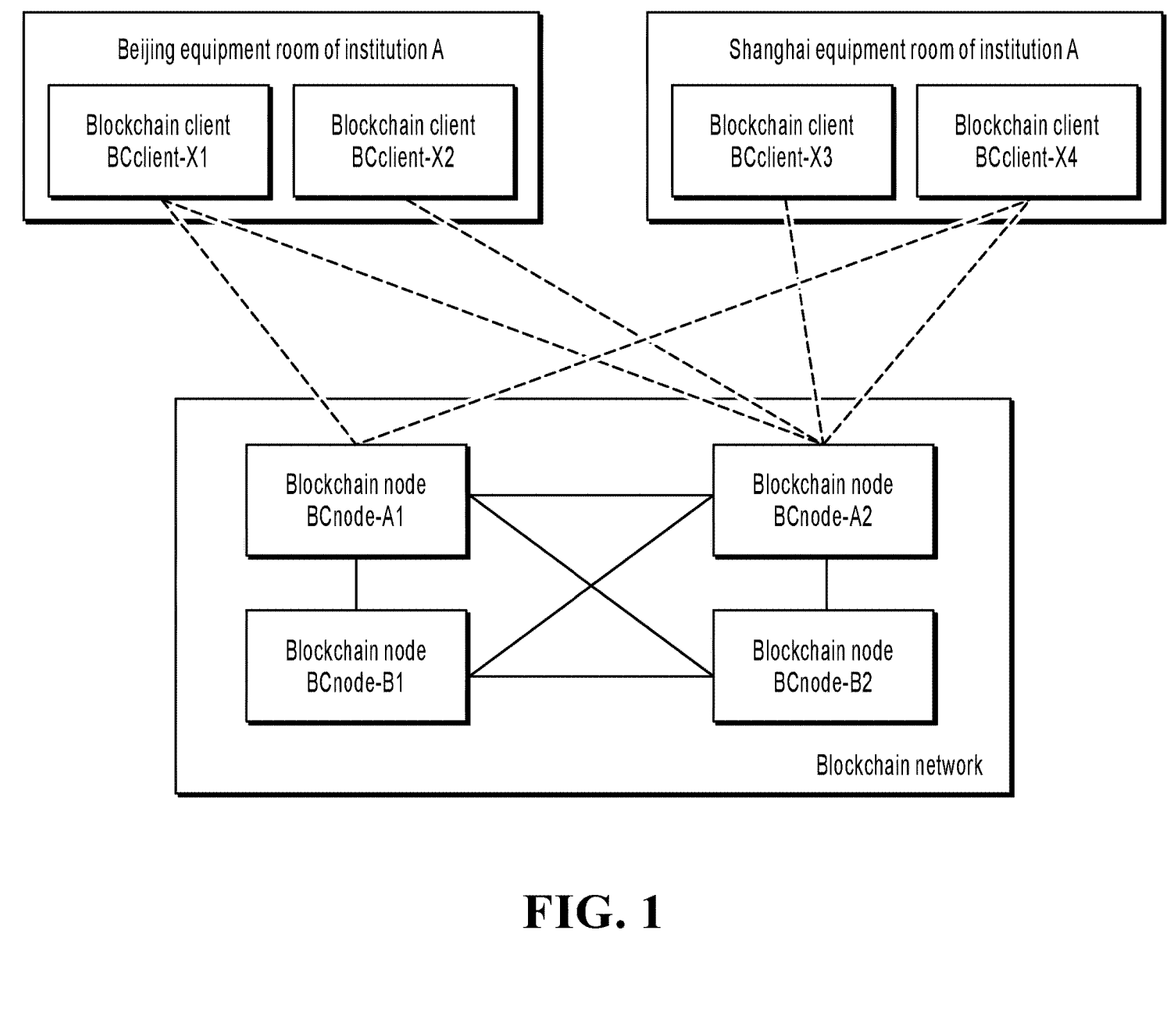
FIG. 1 is a schematic diagram illustrating a functional structure of a data processing system, according to an implementation of the present specification.

References are made to FIG. 1. The implementations of the present specification provide a data processing system.

In some implementations, the data processing system can include a blockchain network. The blockchain network can be, for example, a peer-to-peer (P2P) network, etc. A blockchain can be established based on the blockchain network. The blockchain can be a distributed ledger that organizes a plurality of data blocks in a chain structure in chronological order and ensures security, traceability and tamper-resistance by using a cryptographic algorithm. The blockchain can be, for example, a public blockchain, a consortium blockchain, or a private blockchain.

The blockchain network can include a plurality of blockchain nodes. The distributed ledger is maintained jointly by the plurality of blockchain nodes. The plurality of blockchain nodes can belong to a plurality of institutions. Each institution can include one or more blockchain nodes in the blockchain network. For example, institution A can include blockchain nodes BCnode-A1 and BCnode-A2 in the blockchain network, and institution B can include blockchain nodes BCnode-B1 and BCnode-B2 in the blockchain network.

In some implementations, the data processing system can further include blockchain clients of the plurality of institutions. Specifically, each institution can include one or more blockchain clients, these one or more blockchain clients can share an institutional account of the institution in the blockchain. Each blockchain client of each institution can communicate with one or more blockchain nodes of the institution. Referring back to the previous example, institution A can include blockchain clients BCclient-X1, BCclient-X2, BCclient-X3, and BCclient-X4. The blockchain client BCclient-X1 can communicate with the blockchain node BCnode-A1 and the blockchain node BCnode-A2 at the same time. The blockchain clients BCclient-X2 and BCclient-X3 can separately communicate with the blockchain node BCnode-A2. The blockchain client BCclient-X4 can communicate with the blockchain node BCnode-A1 and the blockchain node BCnode-A2 at the same time. The blockchain client here can be, for example, a device such as a business server, a mobile phone, a tablet computer, or a personal computer, or can be a system that includes a plurality of devices, for example, a server cluster consisting of a plurality of business servers.

In an example scenario, for reasons such as disaster tolerance and recovery, each institution can deploy one or more equipment rooms, and each equipment room can include one or more blockchain clients of the institution. Referring back to the previous example, institution A can deploy Beijing equipment room and Shanghai equipment room. Beijing equipment room can include the blockchain clients BCclient-X1 and BCclient-X2. Shanghai equipment room can include the blockchain clients BCclient-X3 and BCclient-X4.

Figure 2:
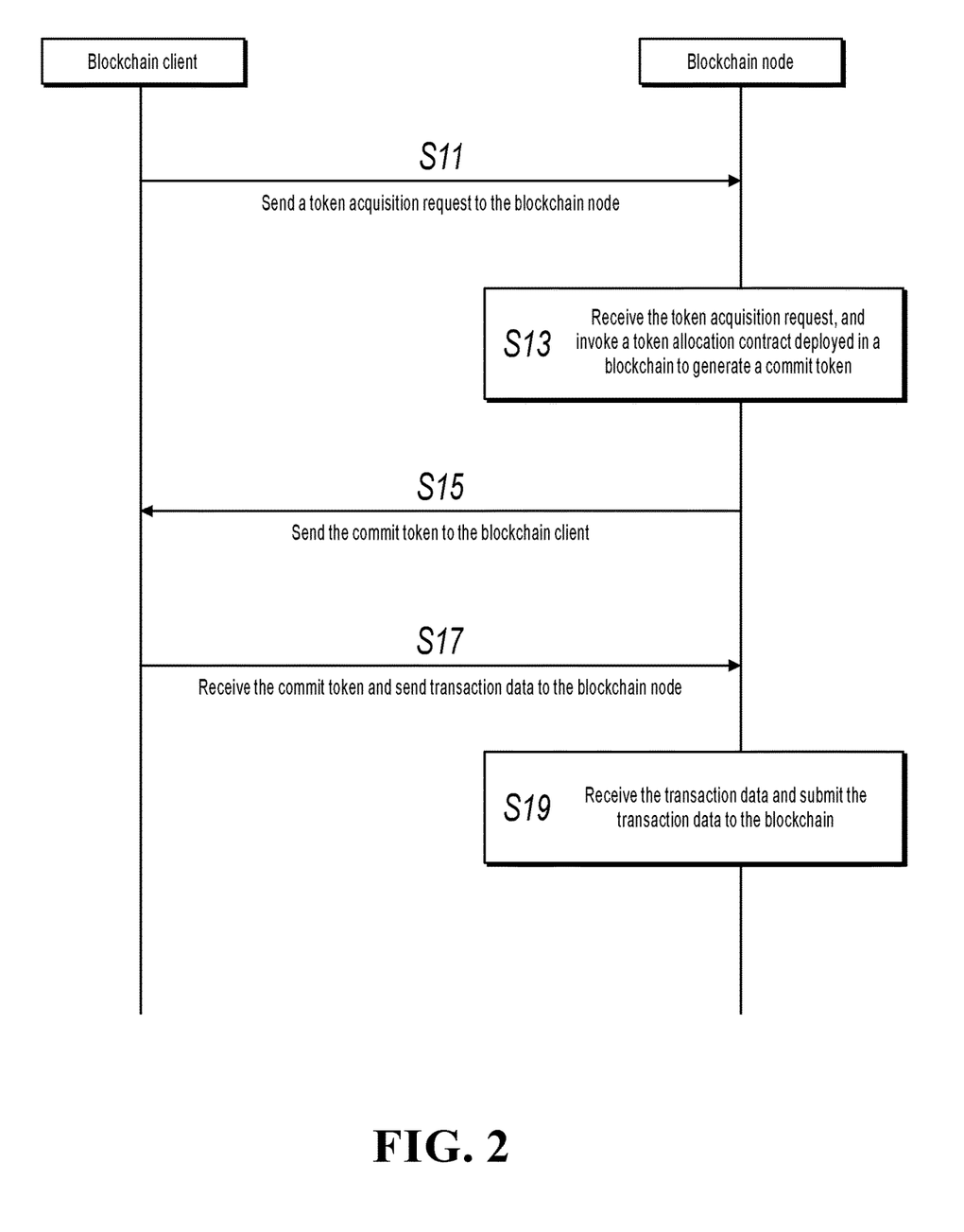
FIG. 2 is a flowchart illustrating a data processing method, according to an implementation of the present specification.

Based on the data processing system, the following describes an implementation of the data processing method in the present specification. Referring to FIG. 2, the implementation can include the following steps.

S11: The blockchain client sends a token acquisition request to the blockchain node.

In some implementations, the blockchain client and the blockchain node can belong to the same institution. The blockchain client can send the token acquisition request to the blockchain node before submitting transaction data. The token acquisition request can include at least one of an institution identifier, a client identifier, or a block height (hereinafter referred to as a first block height for ease of description). The institution identifier can be used to identify the institution that the blockchain client belongs to. The client identifier can be used to identify the blockchain client. The first block height can be used to indicate a location of the data block requested by the blockchain client in the blockchain.

The blockchain client can obtain a block height (hereinafter referred to as a second block height for ease of description) of the blockchain; and can determine the first block height based on the second block height. In an example scenario, the blockchain client can query the first block height. For example, the blockchain client can send a block height query request to the blockchain node. The blockchain node can receive the block height query request; can obtain the first block height; and can feed back the first block height to the blockchain client. In another example scenario, the blockchain node can actively push the first block height to the blockchain client. For example, the blockchain node can preset a block height push event. When a new data block is uploaded to the blockchain, the block height push event can be triggered. When detecting that the block height push event is triggered, the blockchain node can obtain the first block height, and can push the first block height to the blockchain client. It is worthwhile to note that, a data block uploaded to the blockchain later has a larger block height, and a data block uploaded to the blockchain earlier has a smaller block height. Therefore, the second block height is usually less than the first block height. The blockchain client can specifically determine the first block height in any way. For example, the blockchain client can calculate the sum of the second block height and N as the first block height. N is a natural number greater than 0, such as 1, 2, etc.

In some implementations, the blockchain client can communicate with one blockchain node. As such, the blockchain client can directly send a token acquisition request to the blockchain node. Alternatively, the blockchain client can communicate with a plurality of blockchain nodes. As such, the blockchain client can select a blockchain node from the plurality of blockchain nodes, and can send a token acquisition request to the selected blockchain node. The blockchain client can select a blockchain node in any way. For example, the blockchain client can randomly select a blockchain node.

S13: The blockchain node receives the token acquisition request, and invokes a token allocation contract deployed in the blockchain to generate a commit token.

In some implementations, a token allocation contract can be deployed in the blockchain. The token allocation contract can be a native smart contract or a customized smart contract. The customized smart contract can be a smart contract developed by a technician or programmer by using the code. For example, a technician or programmer of an institution can write a token allocation contract in an advanced computer language. The blockchain node of the institution can compile the token allocation contract to obtain bytecode; can generate a transaction for constructing a token allocation contract based on the bytecode; and can submit the transaction for constructing a token allocation contract to the blockchain so that the token allocation contract is deployed on the blockchain.

The token allocation contract can be a segment of executable program code for coordinating the allocation of the commit token among the plurality of blockchain clients of the same institution. In an example scenario, the commit token can be allocated in the token allocation contract in a round-robin way. For example, institution A can include blockchain clients BCclient-X1, BCclient-X2, BCclient-X3, and BCclient-X4. Based on the token allocation contract, the commit token can be allocated in turn among the blockchain clients BCclient-X1, BCclient-X2, BCclient-X3, and BCclient-X4 in a round-robin way. In another example scenario, the commit token can be randomly allocated in the token allocation contract. For example, institution A can include blockchain clients BCclient-X1, BCclient-X2, BCclient-X3, and BCclient-X4. Based on the token allocation contract, a blockchain client is randomly selected from the blockchain clients BCclient-X1, BCclient-X2, BCclient-X3, and BCclient-X4, and the commit token is allocated to the selected blockchain client. Certainly, the previous allocation methods are merely examples. In practice, any method that can allocate the commit token can be used as the method for allocating the commit token in the token allocation contract. It is worthwhile to note that, the commit token is allocated in the token allocation contract on a per-institution basis. Each institution joining the blockchain can use the token allocation contract to allocate the commit token among blockchain clients of the institution.

An input of the token allocation contract can include at least one of an institution identifier, a client identifier, or a first block height. In an example scenario, the input of the token allocation contract can include the institution identifier, the client identifier, and the first block height. The token allocation contract can be represented as Allocate(InstitutionID, ClientID, BlockHeight), where InstitutionID represents the institution identifier, ClientID represents the client identifier, and BlockHeight represents the first block height. In another example scenario, the input of the token allocation contract can include the institution identifier and the client identifier. The token allocation contract can be represented as Allocate(InstitutionID, ClientID). In another example scenario, the input of the token allocation contract can include the institution identifier. The token allocation contract can be represented as Allocate(InstitutionID).

An output of the token allocation contract can include the commit token. The blockchain client that obtains the commit token can have permission to send transaction data to the blockchain node, thereby having permission to submit transaction data to a specific data block of the blockchain. The specific data block can be, for example, a data block corresponding to the first block height. It is worthwhile to note that, the blockchain client submits the transaction data to the data block, the blockchain client can be understood as follows: The blockchain client sends the transaction data to the blockchain node, and the blockchain node submits the transaction data to the blockchain. As such, the blockchain client submits the transaction data to the data block of the blockchain. Using the token allocation contract can prevent the plurality of blockchain clients of the same institution from obtaining the commit token at the same time. It can prevent the plurality of blockchain clients of the same institution from concurrently sending transaction data to the blockchain node, thereby alleviating a transaction conflict problem.

The commit token can further include the first block height.

In some implementations, as previously described, the input of the token allocation contract can include at least one of the institution identifier, the client identifier, or the first block height. As such, the blockchain node can invoke the token allocation contract by using at least one of the institution identifier, the client identifier, or the first block height as an input parameter, to generate the commit token.

The blockchain node can invoke the token allocation contract based on the address of the token allocation contract. Specifically, the blockchain node can obtain the token allocation contract based on the address of the token allocation contract, and can locally execute the token allocation contract, thereby invoking the token allocation contract. The token allocation contract can be a native smart contract. As such, the blockchain node can obtain the address of the token allocation contract when accessing the blockchain network. Alternatively, the token allocation contract can be a customized smart contract. Here, for ease of description, the blockchain node that invokes the token allocation contract can be referred to as a first blockchain node, and a blockchain node that deploys the token allocation contract can be referred to as a second blockchain node. As such, the second blockchain node can send the address of the token allocation contract to the first blockchain node in any way. For example, an off-chain channel can be established between the second blockchain node and the first blockchain node. Based on the established off-chain channel, the second blockchain node can send the address of the token allocation contract to the first blockchain node.

In some implementations, by invoking the token allocation contract deployed in the blockchain, the blockchain node can further obtain information indicating a commit token generation failure. The blockchain node can feed back the information indicating a commit token generation failure to the blockchain client. The blockchain client can receive the information indicating a commit token generation failure, and can give up sending transaction data to the blockchain node.

S15: The blockchain node sends the commit token to the blockchain client.

In some implementations, in S13, the blockchain node can obtain the commit token. The blockchain node can then send the commit token to the blockchain client.

S17: The blockchain client receives the commit token and sends transaction data to the blockchain node.

In some implementations, the blockchain client can receive the commit token; can construct one or more pieces of transaction data according to the format of the transaction data in the blockchain; and can send the one or more pieces of transaction data to the blockchain node. The transaction data can include transaction data in a narrow sense and transaction data in a broad sense. The transaction data in a narrow sense includes transaction data that enables value transfer, such as transaction data of a transfer transaction. The transaction data in a broad sense includes business data that can realize business intents, such as rentals, certificates, vehicle schedules, insurance claims, etc. In an example scenario, the blockchain client can construct one or more pieces of transaction data based on transaction-related information sent by an upstream device according to the format of the transaction data in the blockchain. For example, the blockchain client can be a business server of an institution, and an upstream device of the business server can include a user terminal. Therefore, the business server can construct one or more pieces of transaction data based on transaction-related information sent by a user terminal according to the format of the transaction data in the blockchain.

The blockchain client can further construct one or more pieces of transaction data based on the commit token. The constructed transaction data can include the commit token. As such, the consensus blockchain node can easily verify validity of a token in the one or more pieces of transaction data in a later process. For example, the commit token can include the first block height. As such, for each piece of transaction data, the consensus blockchain node can obtain a first block height included in a commit token of the transaction data; can obtain a first block height requested by the blockchain client from status data of the blockchain; and can compare the two block heights, so as to verify validity of a commit token in the transaction data.

The blockchain client can further construct one or more pieces of transaction data based on a current Nonce value of an institutional account. The institutional account can be an account of an institution that the blockchain client belongs to in the blockchain. The Nonce value can be a random number or a pseudo-random number used to prevent a replay attack on a blockchain. One Nonce value can be used by only one piece of transaction data. Different transaction data includes different Nonce values. For example, Nonce values can be monotonically increasing in different transaction data. Specifically, the blockchain client can obtain the current Nonce value of the institutional account, and can construct one or more pieces of transaction data based on the obtained Nonce value. For example, the current Nonce value of the institutional account can be 100. The blockchain client can construct three pieces of transaction data: transaction data with Nonce value 101, transaction data with Nonce value 102, and transaction data with Nonce value 103. In an example scenario, the blockchain client can query the current Nonce value of the institutional account. For example, the blockchain client can send a Nonce value query request to the blockchain node. The blockchain node can receive the Nonce value query request; can obtain the current Nonce value of the institutional account; and can feed back the obtained Nonce value to the blockchain client. In another example scenario, the blockchain node can actively push the current Nonce value of the institutional account to the blockchain client. For example, the blockchain node can obtain the current Nonce value of the institutional account at a predetermined time interval, and can push the obtained Nonce value to the blockchain client.

Certainly, the blockchain client can further construct one or more pieces of transaction data based on other information, which is not listed here. The other information can include, for example, the address of the institutional account.

In some implementations, the blockchain client can directly send one or more pieces of transaction data to the blockchain node. Alternatively, the blockchain client can package one or more pieces of transaction data in a specific order to obtain a data packet; and can send the data packet to the blockchain node. The specific order can include, for example, a chronological order of transactions.

S19: The blockchain node receives the transaction data and submits the transaction data to the blockchain.

In some implementations, the blockchain node can receive the transaction data, and can submit the transaction data to the blockchain so that the consensus blockchain node processes the transaction data. After processing the transaction data, the consensus blockchain node can construct a data block that includes the transaction data; and can store the data block on the blockchain based on a chained data structure. A block height of the data block constructed by the consensus blockchain node can be equal to the first block height. As such, the blockchain client submits transaction data to the data block corresponding to the first block height.

In some implementations, the blockchain node can receive the transaction data from the blockchain client, and can submit the received transaction data to the blockchain. Alternatively, the blockchain node can receive a data packet from the blockchain client, and can submit the data packet to the blockchain. As such, the consensus blockchain node can process the transaction data in the data packet in an arrangement order of the transaction data in the data packet.

According to the data processing method in some implementations of the present specification, the blockchain client can send a token acquisition request to the blockchain node; the blockchain node can receive the token acquisition request, can invoke a token allocation contract deployed in the blockchain, to generate a commit token, and can send the commit token to the blockchain client; the blockchain client can receive the commit token and can send transaction data to the blockchain node; and the blockchain node can receive the transaction data and can submit the transaction data to the blockchain. As such, the token allocation contract deployed in the blockchain is used to coordinate the submission permissions of the plurality of blockchain clients of the same institution, so as to prevent the plurality of blockchain clients of the same institution from concurrently sending transaction data to the blockchain node, thereby alleviating a transaction conflict problem.

Figure 3:
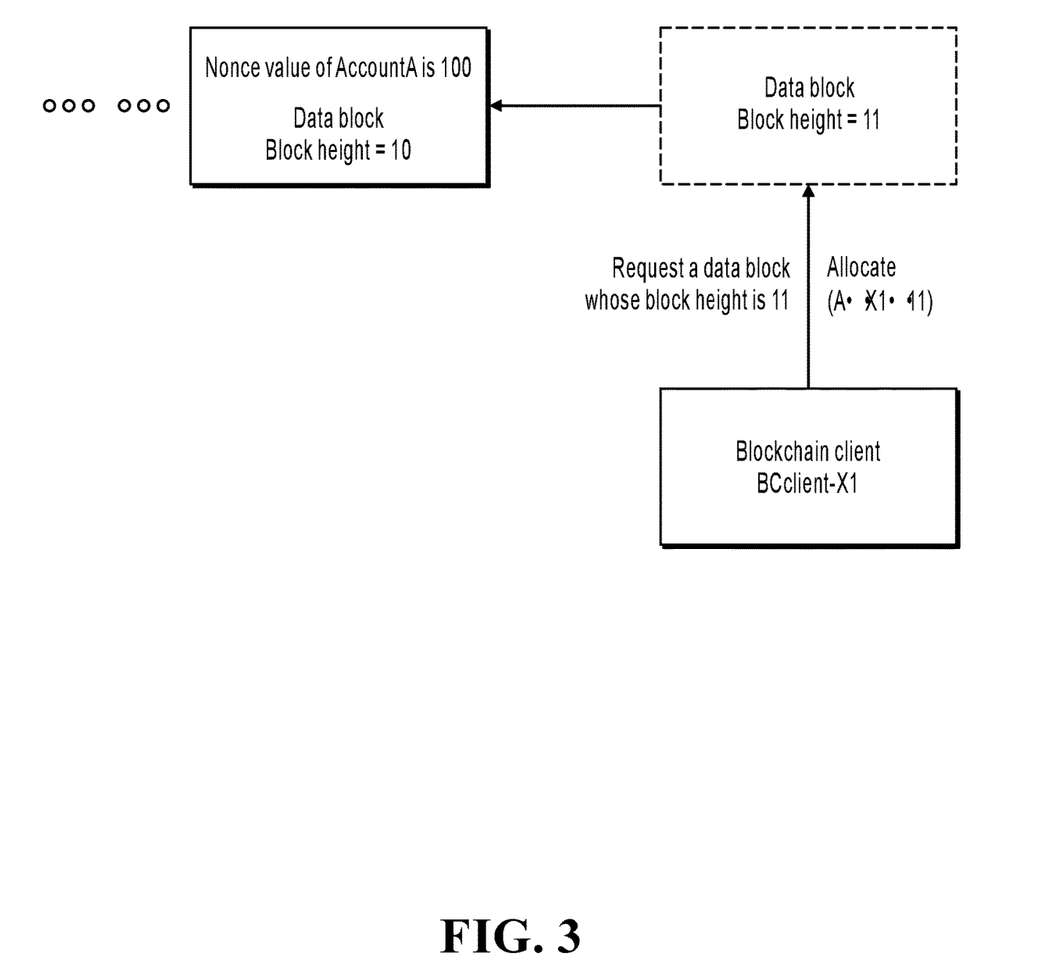
FIG. 3 is a flowchart illustrating a data processing method, according to an implementation of the present specification.

References are made to FIG. 3. The following describes an example scenario of an implementation of the present specification.

A system architecture in the example scenario can be shown in FIG. 1. In the example scenario, a block height of the blockchain can be 10. A token allocation contract can be deployed in the blockchain. An input of the token allocation contract can include an institution identifier, a client identifier, and a block height. An output of the token allocation contract can include a commit token. The token allocation contract can be specifically represented as Allocate(InstitutionID, ClientID, BlockHeight).

Institution A can include blockchain clients BCclient-X1, BCclient-X2, BCclient-X3, and BCclient-X4; and can include blockchain nodes BCnode-A1 and BCnode-A2. The institutional account of institution A in the blockchain can be AccountA. The current Nonce value of the institutional account AccountA can be 100. Client identifiers of the blockchain clients BCclient-X1, BCclient-X2, BCclient-X3, and BCclient-X4 can be X1, X2, X3, and X4, respectively.

The blockchain client BCclient-X1 can send a token acquisition request to the blockchain node BCnode-A1. The token acquisition request can include an institution identifier A, a client identifier X1, and a block height 11. The blockchain node BCnode-A1 can receive the token acquisition request; can invoke the token allocation contract Allocate(A, X1, 11) by using the institution identifier A, the client identifier X1, and the block height 11 as input parameters, to generate a submit token; and can send the commit token to the blockchain client BCclient-X1. The commit token can include the block height 11.

The blockchain client BCclient-X1 can receive the commit token; and can construct transaction data TX1, TX2, and TX3 according to the format of the transaction data in the blockchain. The transaction data TX1 can include the commit token and the Nonce value 101 of the institutional account AccountA. The transaction data TX2 can include the commit token and the Nonce value 102 of the institutional account AccountA. The transaction data TX3 can include the commit token and the Nonce value 103 of the institutional account AccountA.

The blockchain client BCclient-X1 can package the transaction data TX1, TX2, and TX3 to obtain a data packet, and can send the data packet to the blockchain node BCnode-A1. The blockchain node BCnode-A1 can receive the data packet and can submit the data packet to the blockchain.

Figure 4:
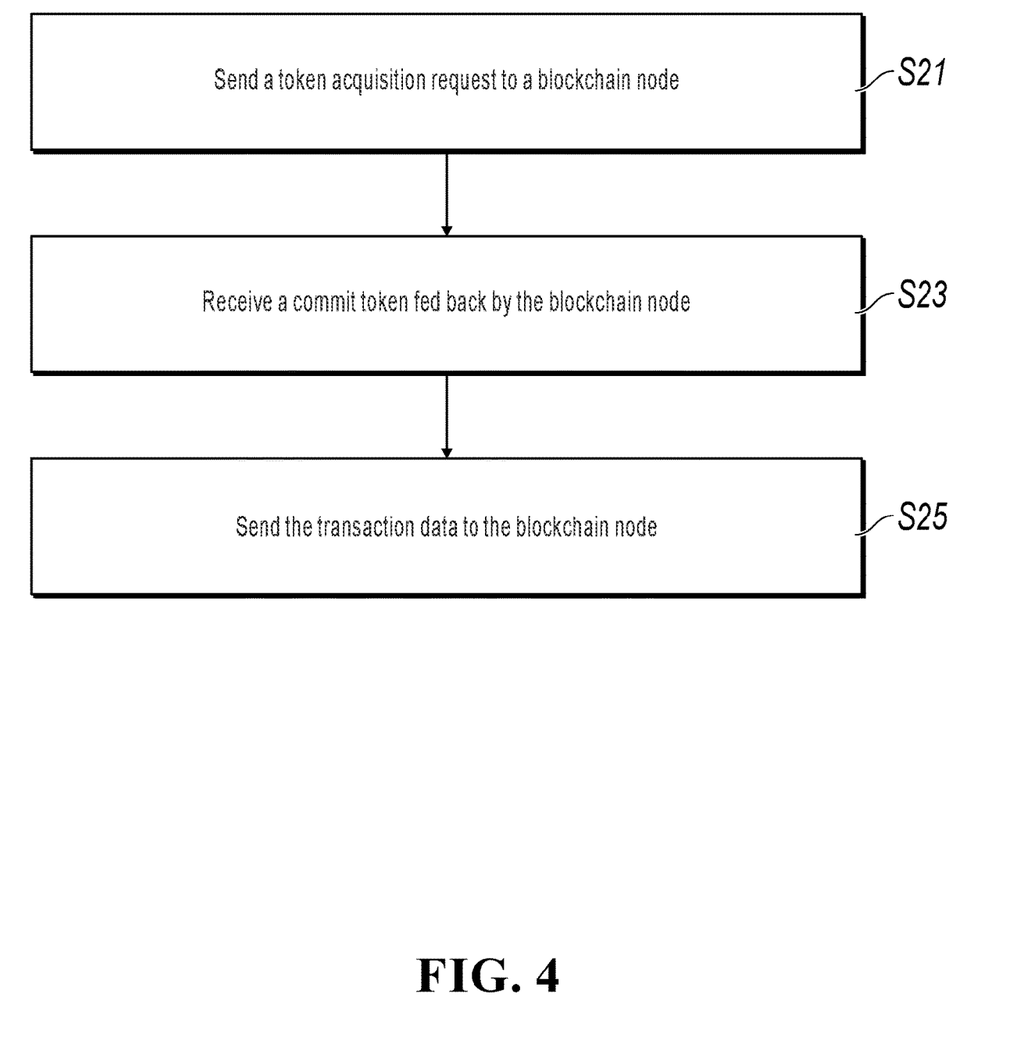
FIG. 4 is a flowchart illustrating a data processing method, according to an implementation of the present specification.

The following describes another implementation of a data processing method in the present specification. Referring to FIG. 4, the implementation takes a blockchain client as an execution body and can include the following steps.

S21: Send a token acquisition request to a blockchain node.

The blockchain client can send the token acquisition request to the blockchain node when needing to submit transaction data. The token acquisition request can include at least one of an institution identifier, a client identifier, or a block height. The institution identifier can be used to identify the institution that the blockchain client belongs to. The client identifier can be used to identify the blockchain client. The block height can be used to indicate a location of the data block requested by the blockchain client in the blockchain.

S23: Receive a commit token fed back by the blockchain node.

The blockchain node can receive the token acquisition request; can invoke a token allocation contract deployed in the blockchain to generate the commit token; and can feed back the commit token to the blockchain client. The blockchain client can receive the commit token. The commit token can be used to indicate that the blockchain client has permission to submit transaction data to a specific data block of the blockchain. The specific data block can be, for example, a data block corresponding to the block height.

S25: Submit the transaction data to the blockchain node.

The blockchain client can receive the commit token; can construct one or more pieces of transaction data according to the format of the transaction data in the blockchain; and can send the one or more pieces of transaction data to the blockchain node. The constructed transaction data can include the commit token. The commit token can include the block height.

The blockchain client can send one or more pieces of transaction data to the blockchain node. When sending a plurality of transaction data to the blockchain node, the blockchain client can send the transaction data to the blockchain node one by one. Alternatively, the blockchain client can package the plurality of transaction data in a specific order to obtain a data packet; and can send the data packet to the blockchain node. The specific order can include, for example, a chronological order of transactions.

According to the data processing method in some implementations of the present specification, the blockchain client can send the token acquisition request to the blockchain node; can receive the commit token fed back by the blockchain node; and can send transaction data to the blockchain node. As such, the blockchain client sends transaction data to the blockchain node only after obtaining the commit token.

Figure 5:
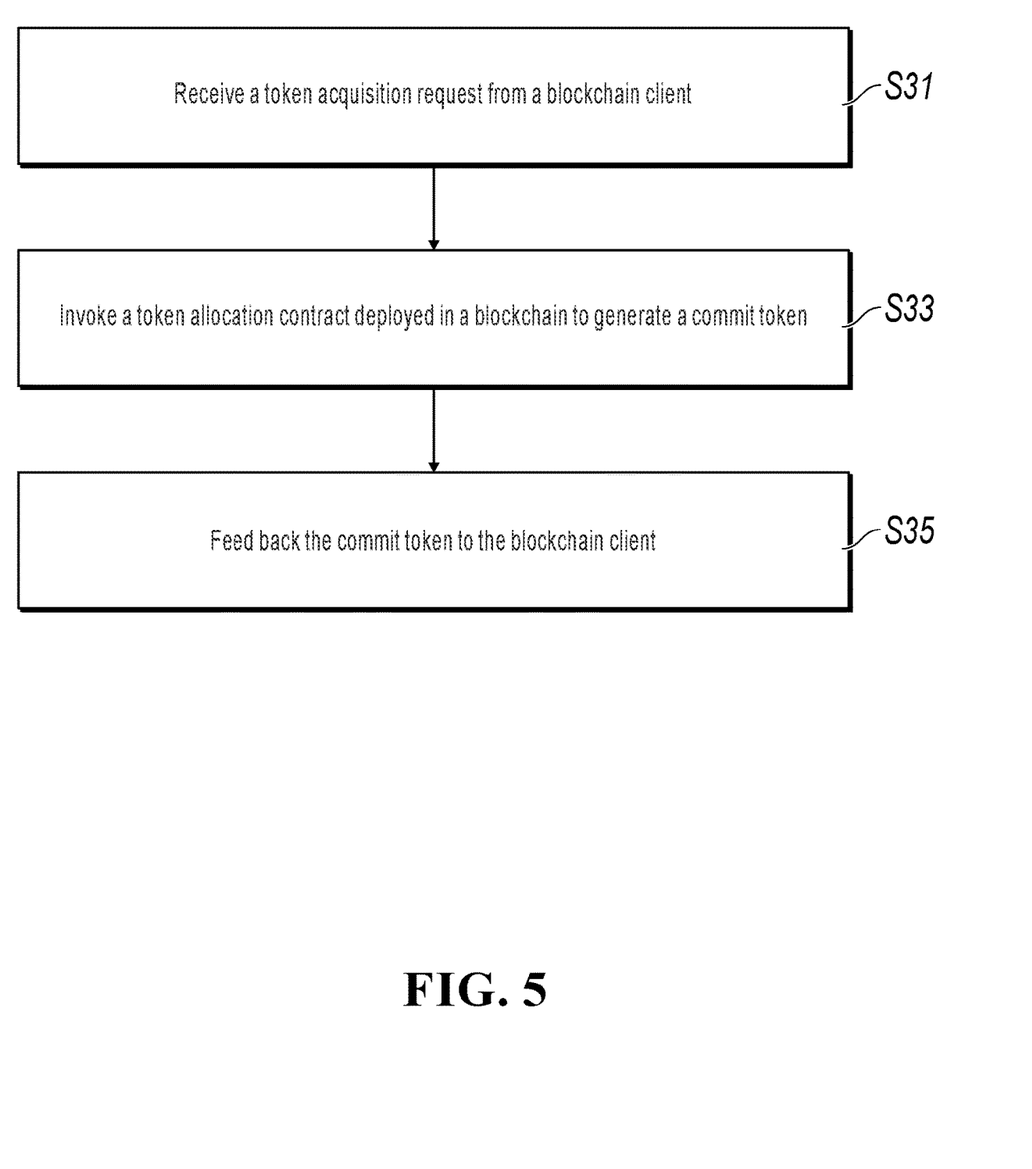
FIG. 5 is a flowchart illustrating a data processing method, according to an implementation of the present specification.

The following describes another implementation of a data processing method in the present specification. Referring to FIG. 5, the implementation takes a blockchain node as an execution body and can include the following steps.

S31: Receive a token acquisition request from a blockchain client.

The token acquisition request can include at least one of an institution identifier, a client identifier, or a block height. The institution identifier can be used to identify the institution that the blockchain client belongs to. The client identifier can be used to identify the blockchain client. The block height can be used to indicate a location of the data block requested by the blockchain client in the blockchain.

S33: Invoke a token allocation contract deployed in the blockchain to generate a commit token.

The commit token can be used to indicate that the blockchain client has permission to submit transaction data to a specific data block of the blockchain. The token allocation contract can be used to coordinate the allocation of the commit token among the plurality of blockchain clients of the same institution. An input of the token allocation contract can include at least one of an institution identifier, a client identifier, or a first block height. As such, the blockchain node can invoke the token allocation contract by using at least one of the institution identifier, the client identifier, or the first block height as an input parameter, to generate the commit token.

S35: Feed back the commit token to the blockchain client.

The blockchain client can receive the commit token; can construct one or more pieces of transaction data according to the format of the transaction data in the blockchain; and can send the one or more pieces of transaction data to the blockchain node. The blockchain node receives the transaction data and submits the transaction data to the blockchain. The transaction data can include the commit token. The commit token can include the block height.

According to the data processing method in some implementations of the present specification, the blockchain node can receive the token acquisition request from the blockchain client; can invoke the token allocation contract deployed in the blockchain, to generate a commit token; and can feed back the commit token to the blockchain client. As such, the token allocation contract deployed in the blockchain is used to coordinate the submission permissions of the plurality of blockchain clients of the same institution, so as to prevent the plurality of blockchain clients of the same institution from concurrently sending transaction data to the blockchain node, thereby alleviating a transaction conflict problem.

Figure 6:
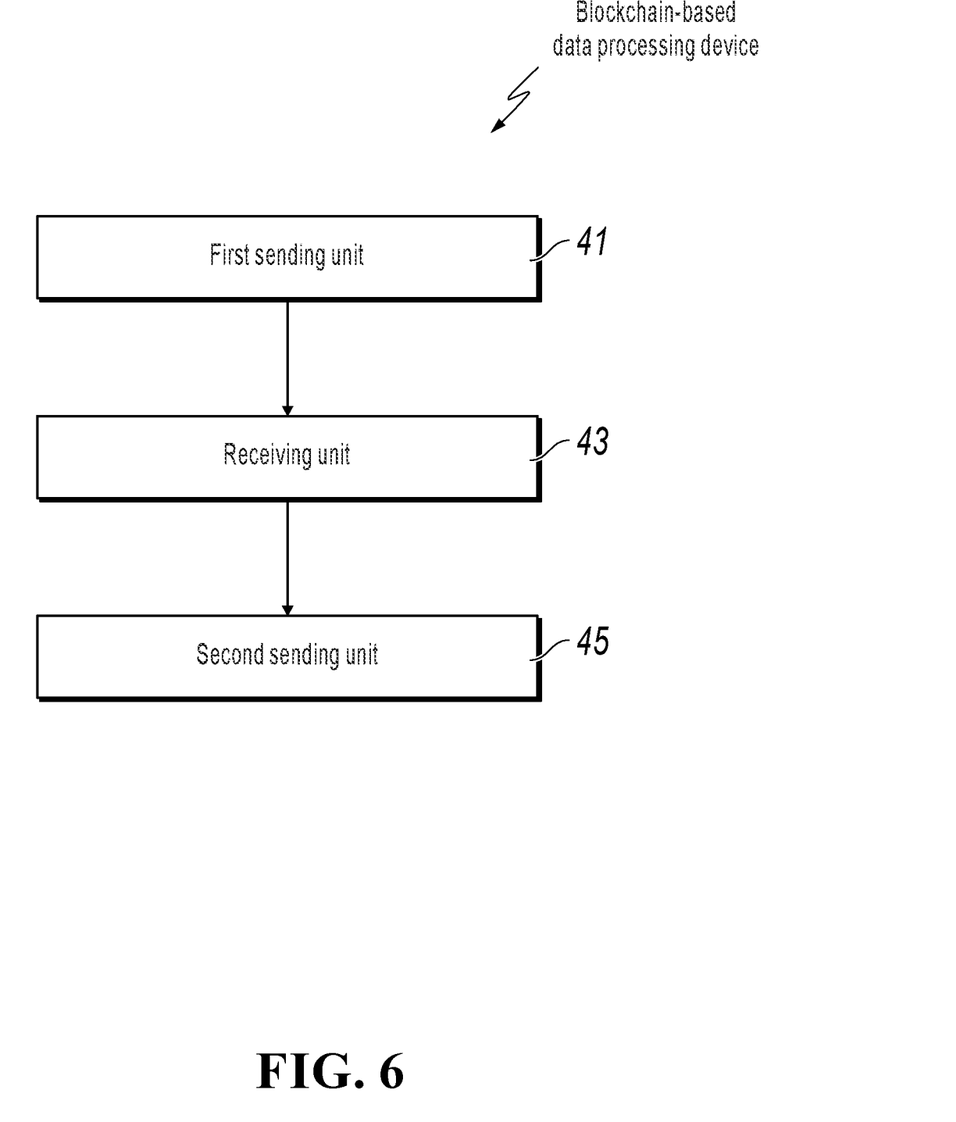
FIG. 6 is a schematic diagram illustrating a functional structure of a data processing device, according to an implementation of the present specification.

The following describes an implementation of a data processing device in the present specification. References are made to FIG. 6. The present implementation can be applied to the blockchain client, and can include the following units: a first sending unit 41, configured to send a token acquisition request to a blockchain node; a receiving unit 43, configured to receive a commit token fed back by the blockchain node, where the commit token is used to indicate that the blockchain client has permission to submit transaction data to a specific data block of the blockchain; and a second sending unit 45, configured to send transaction data to the blockchain node.

Figure 7:
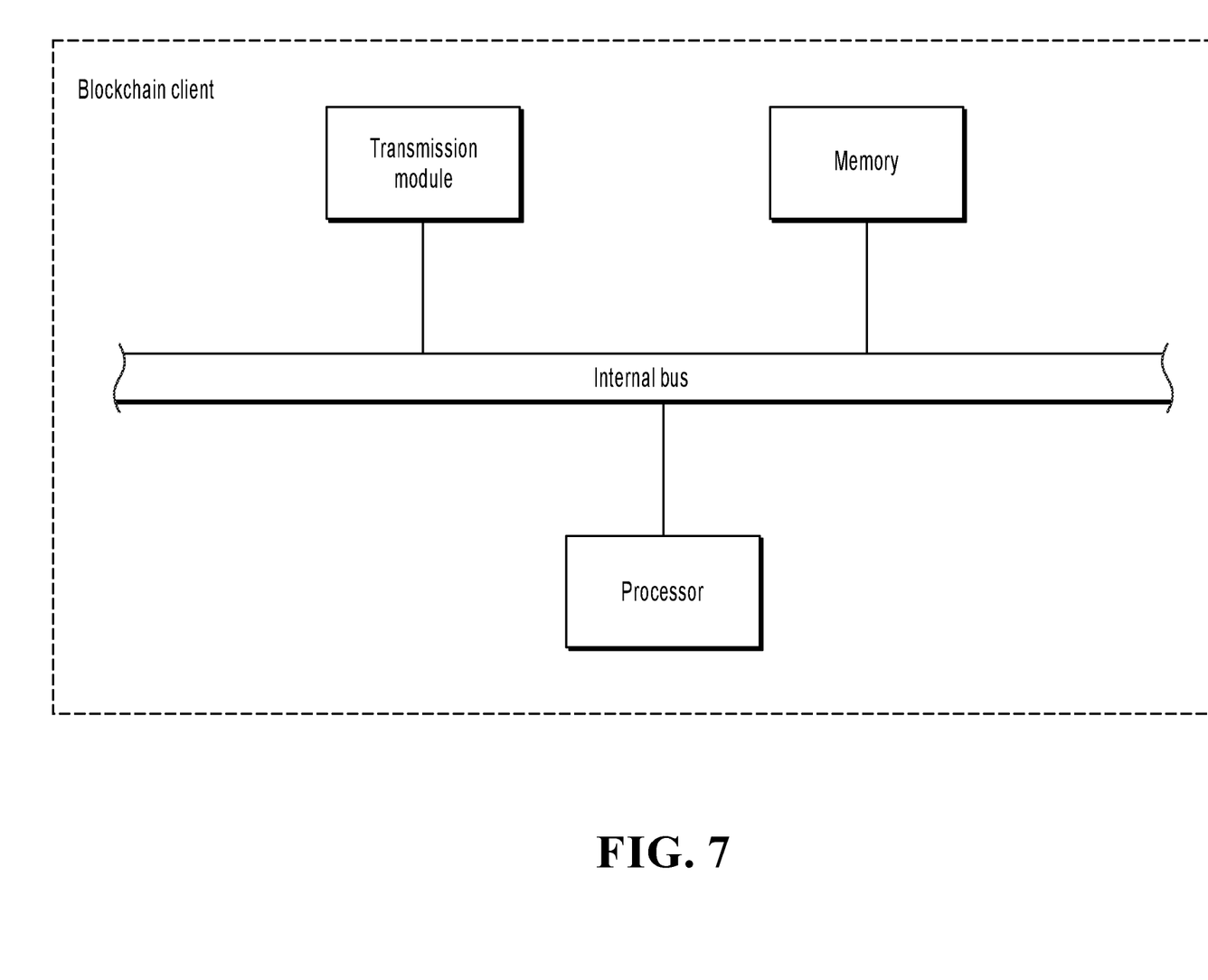
FIG. 7 is a schematic diagram illustrating a functional structure of a blockchain client, according to an implementation of the present specification.

The following describes an implementation of a blockchain client in the present specification. FIG. 7 is a schematic diagram of a hardware structure of a blockchain client in the implementation. As shown in FIG. 7, the blockchain client can include one or more processors (only one processor is shown in the figure), one or more memories, and one or more transmission modules. Certainly, a person of ordinary skill in the art can understand that the hardware structure shown in FIG. 7 is merely an example, and does not limit the hardware structure of the previous blockchain client. In practice, the blockchain client can further include more or less components or units than those shown in FIG. 7, or can have a configuration different from that shown in FIG. 7.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the blockchain client by using a network such as the Internet, an intranet, a local area network, or a mobile communications network. The memory can be configured to store a program instruction or module of application software, for example, a program instruction or module corresponding to the data processing method in some implementations of the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

Figure 8:
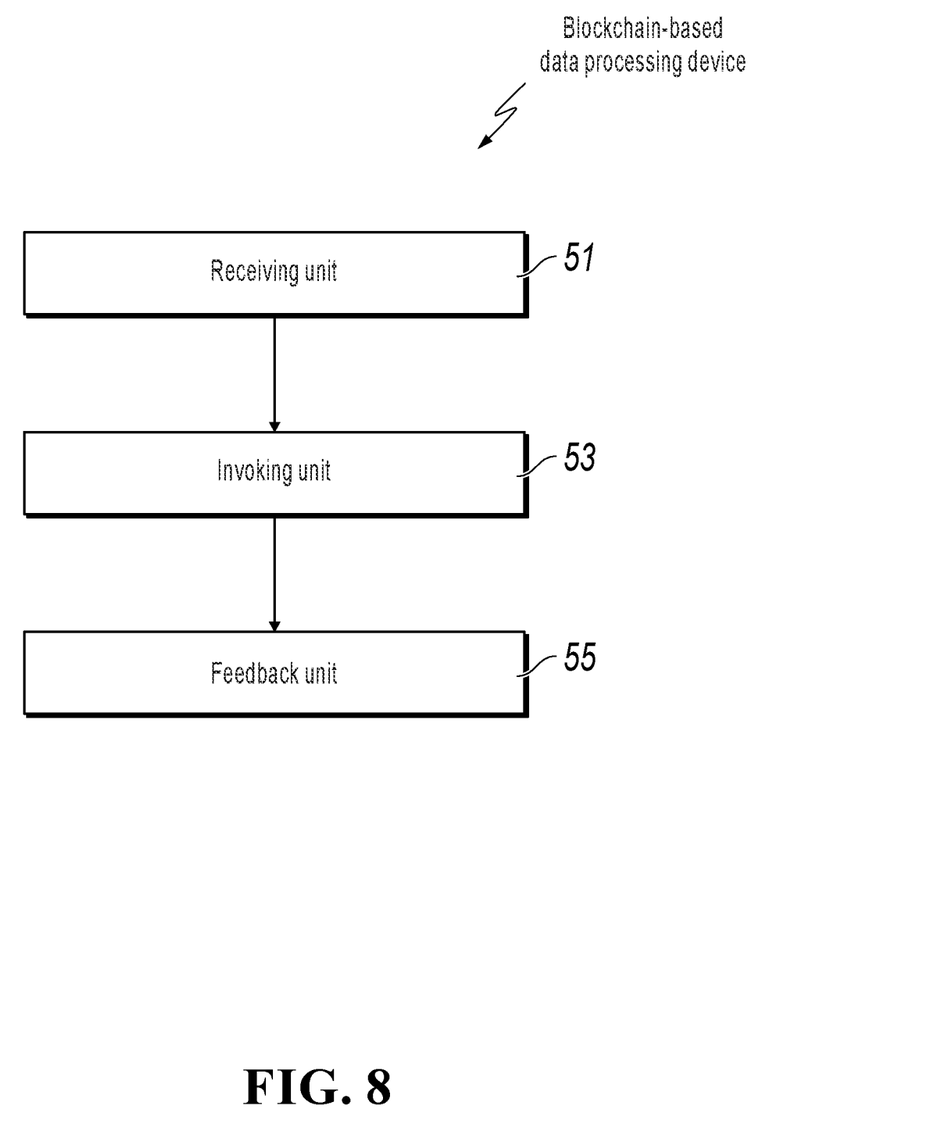
FIG. 8 is a schematic diagram illustrating a functional structure of a data processing device, according to an implementation of the present specification.

The following describes an implementation of a data processing device in the present specification. References are made to FIG. 8. The present implementation can be applied to the blockchain node, and can include the following units: a receiving unit 51, configured to receive a token acquisition request from a blockchain client; an invoking unit 53, configured to invoke a token allocation contract deployed in a blockchain to generate a commit token, where the commit token is used to indicate that the blockchain client has permission to submit transaction data to a specific data block in the blockchain, and the token allocation contract is used to coordinate allocation of the commit token among a plurality of blockchain clients of the same institution; and a feedback unit 55, configured to feed back the commit token to the blockchain client.

Figure 9:
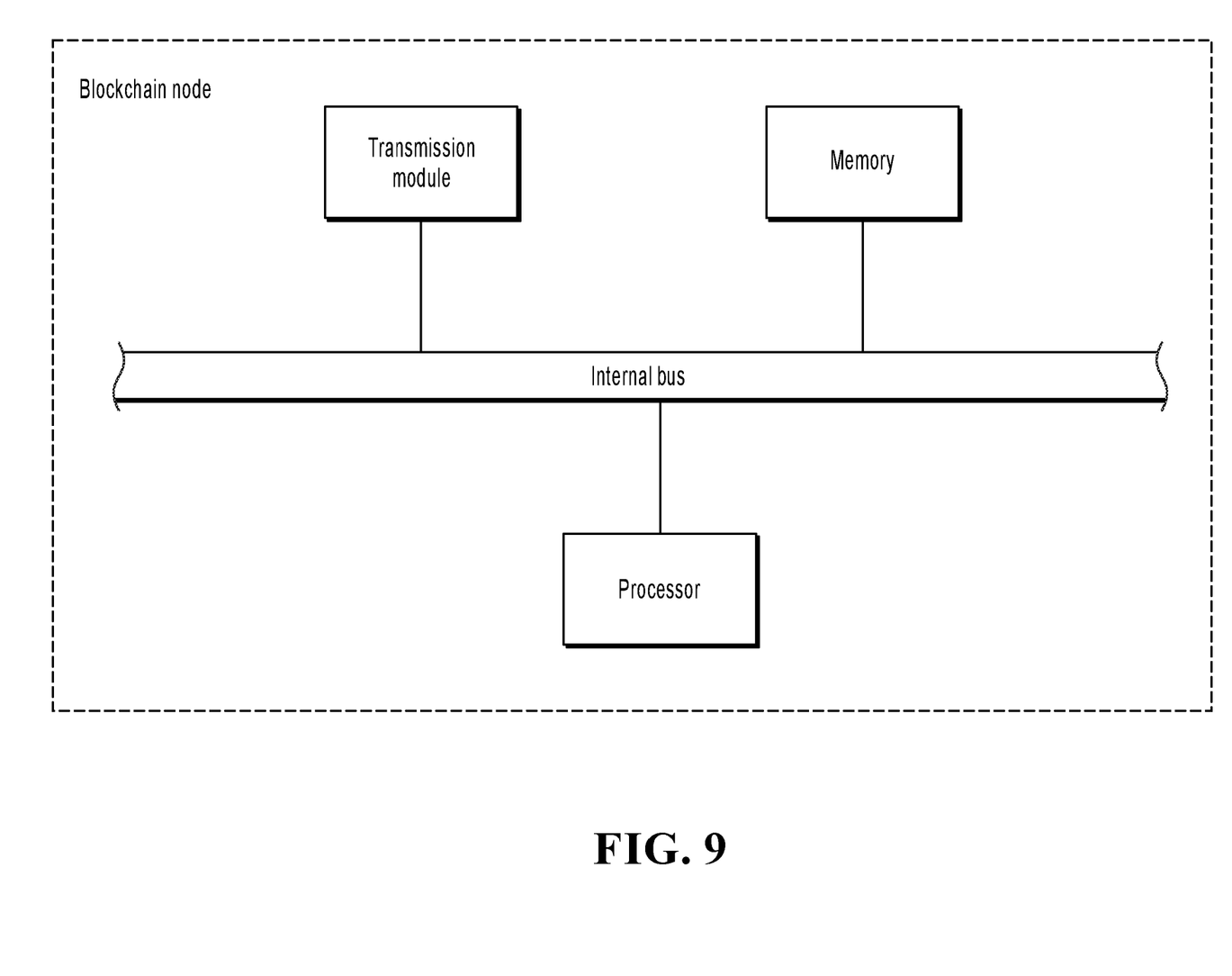
FIG. 9 is a schematic diagram illustrating a functional structure of a blockchain node, according to an implementation of the present specification.

The following describes an implementation of a blockchain node in the present specification. FIG. 9 is a schematic diagram of a hardware structure of a blockchain node in the implementation. As shown in FIG. 9, the blockchain node can include one or more processors (only one processor is shown in the figure), one or more memories, and one or more transmission modules. Certainly, a person of ordinary skill in the art can understand that the hardware structure shown in FIG. 9 is merely an example, and does not limit the hardware structure of the previous blockchain node. In practice, the blockchain node can further include more or less components or units than those shown in FIG. 9, or can have a configuration different from that shown in FIG. 9.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the blockchain node by using a network such as the Internet, an intranet, a local area network, or a mobile communications network. The memory can be configured to store a program instruction or module of application software, for example, a program instruction or module corresponding to the data processing method in some implementations of the present specification.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are progressively described, for the same or similar parts in some implementations, references can be made to each other, and each implementation focuses on a difference from other implementations. In particular, the device implementation, the blockchain client implementation, and the blockchain node implementation are basically similar to the data processing method implementation, and therefore are described briefly; for related parts, references can be made to the related descriptions in the data processing method implementation.

In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, device, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in some implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method, comprising:
receiving a first token acquisition request by a blockchain node from a blockchain client, wherein the first token acquisition request applies for permission to submit first transaction data to a blockchain maintained by the blockchain node, wherein the blockchain node is configured to communicate with the blockchain client and a second blockchain client, the blockchain client and the second blockchain client share an institution account in the blockchain, and the first token acquisition request indicates a first location of a first data block in the blockchain to submit the first transaction data;
sending a commit token by the blockchain node to the blockchain client, wherein the commit token is allocated by the blockchain node based on a smart contract deployed on the blockchain and the commit token indicates that the blockchain client has permission to submit the first transaction data to the first data block in the blockchain;
receiving the first transaction data by the blockchain node from the blockchain client;
receiving a second token acquisition request by the blockchain node from the blockchain client, wherein the second token acquisition request applies for permission to submit second transaction data to the blockchain, wherein the second token acquisition request indicates a second location of a second data block in the blockchain to submit the second transaction data; and
sending, by the blockchain node, failure information to the blockchain client, wherein the failure information is generated based on the smart contract, wherein the failure information indicates that the blockchain client has no permission to submit the second transaction data to the second data block in the blockchain.

2. The computer-implemented method according to claim 1, wherein the first token acquisition request comprises at least one of an institution identifier, a client identifier, or a block height, wherein the institution identifier identifies an institution that the blockchain client belongs to, the client identifier identifies the blockchain client, and the block height indicates the first location of the first data block in the blockchain.

3. The computer-implemented method according to claim 1, wherein receiving the first transaction data comprises receiving the first transaction data with the commit token, and the commit token comprises a block height that indicates the first location of the first data block in the blockchain.

4. The computer-implemented method according to claim 1, wherein receiving the first transaction data comprises:
receiving a data packet comprising at least one piece of transaction data packaged in a specific order.

5. The computer-implemented method according to claim 1, wherein the first token acquisition request comprises a first block height indicating the first location of the first data block in the blockchain.

6. The computer-implemented method according to claim 1, wherein:
the first token acquisition request comprises an institution identifier identifying an institution that the blockchain client belongs to, the institution having the institutional account in the blockchain, and
the first transaction data further comprises a unique Nonce value of the institutional account associated with the first transaction data.

7. The computer-implemented method according to claim 6, wherein:
the second token acquisition request comprises the institution identifier identifying the institution that the blockchain client belongs to, and
the second transaction data further comprises a second unique Nonce value of the institutional account associated with the second transaction data.

8. A computer-implemented system, comprising:
one or more processors; and
one or more computer-readable memories coupled to the one or more processors and having instructions stored thereon that are executable by the one or more processors to perform one or more operations comprising:
receiving a first token acquisition request by a blockchain node from a blockchain client, wherein the first token acquisition request applies for permission to submit first transaction data to a blockchain maintained by the blockchain node, wherein the blockchain node is configured to communicate with the blockchain client and a second blockchain client, the blockchain client and the second blockchain client share an institution account in the blockchain, and the first token acquisition request indicates a first location of a first data block in the blockchain to submit the first transaction data;
sending a commit token by the blockchain node to the blockchain client, wherein the commit token is allocated by the blockchain node based on a smart contract deployed on the blockchain and the commit token indicates that the blockchain client has permission to submit the first transaction data to the first data block in the blockchain; and
receiving the first transaction data by the blockchain node from the blockchain client;
receiving a second token acquisition request by the blockchain node from the blockchain client, wherein the second token acquisition request applies for permission to submit second transaction data to the blockchain, wherein the second token acquisition request indicates a second location of a second data block in the blockchain to submit the second transaction data; and
sending, by the blockchain node, failure information to the blockchain client, the failure information is generated based on the smart contract, wherein the failure information indicates that the blockchain client has no permission to submit the second transaction data to the second data block in the blockchain.

9. The computer-implemented system according to claim 8, wherein the first token acquisition request comprises at least one of an institution identifier, a client identifier, or a block height, wherein the institution identifier identifies an institution that the blockchain client belongs to, the client identifier identifies the blockchain client, and the block height indicates the first location of the first data block in the blockchain.

10. The computer-implemented system according to claim 8, wherein receiving the first transaction data comprises receiving the first transaction data with the commit token, and the commit token comprises a block height that indicates the first location of the first data block in the blockchain.

11. The computer-implemented system according to claim 8, wherein receiving the first transaction data comprises:
receiving a data packet comprising at least one piece of transaction data packaged in a specific order.

12. The computer-implemented system according to claim 8, wherein the first token acquisition request comprises a first block height indicating the first location of the first data block in the blockchain.

13. The computer-implemented system according to claim 8, wherein:
the first token acquisition request comprises an institution identifier identifying an institution that the blockchain client belongs to, the institution having the institutional account in the blockchain, and
the first transaction data further comprises a unique Nonce value of the institutional account associated with the first transaction data.

14. The computer-implemented system according to claim 13, wherein:
the second token acquisition request comprises the institution identifier identifying the institution that the blockchain client belongs to, and
the second transaction data further comprises a second unique Nonce value of the institutional account associated with the second transaction data.

15. A non-transitory, computer-readable medium storing one or more instructions executable by a computer system to perform operations comprising:
receiving a first token acquisition request by a blockchain node from a blockchain client, wherein the first token acquisition request applies for permission to submit first transaction data to a blockchain maintained by the blockchain node, wherein the blockchain node is configured to communicate with the blockchain client and a second blockchain client, the blockchain client and the second blockchain client share an institution account in the blockchain, and the first token acquisition request indicates a first location of a first data block in the blockchain to submit the first transaction data;
sending a commit token by the blockchain node to the blockchain client, wherein the commit token is allocated by the blockchain node based on a smart contract deployed on the blockchain and the commit token indicates that the blockchain client has permission to submit the first transaction data to the first data block in the blockchain; and
receiving the first transaction data by the blockchain client to the blockchain node;
receiving a second token acquisition request by the blockchain node from the blockchain client, wherein the first token acquisition request applies for permission to submit second transaction data to the blockchain, wherein the second token acquisition request indicates a second location of a second data block in the blockchain to submit the second transaction data; and
sending, by the blockchain node, failure information to the blockchain client, wherein the failure information is generated based on the smart contract, wherein the failure information indicates that the blockchain client has no permission to submit the second transaction data to the second data block in the blockchain.

16. The non-transitory, computer-readable medium according to claim 15, wherein the first token acquisition request comprises at least one of an institution identifier, a client identifier, or a block height, wherein the institution identifier identifies an institution that the blockchain client belongs to, the client identifier identifies the blockchain client, and the block height indicates the first location of the first data block in the blockchain that indicates the first location of the first data block in the blockchain.

17. The non-transitory, computer-readable medium according to claim 15, wherein receiving the first transaction data comprises receiving the first transaction data with the commit token, and the commit token comprises a block height that indicates the first location of the first data block in the blockchain.

18. The non-transitory, computer-readable medium according to claim 15, wherein sending the first transaction data comprises:
receiving a data packet comprising at least one piece of transaction data packaged in a specific order.

19. The non-transitory, computer-readable medium according to claim 15, wherein the first token acquisition request comprises a first block height indicating the first location of the first data block in the blockchain.

20. The non-transitory, computer-readable medium according to claim 15, wherein:
the first token acquisition request comprises an institution identifier identifying an institution that the blockchain client belongs to, the institution having the institutional account in the blockchain, and
the first transaction data further comprises a unique Nonce value of the institutional account associated with the first transaction data.

* * * * *

UNITED STATES PATENT AND TRADEMARK OFFICE
CERTIFICATE OF CORRECTION

| | | |
|---|---|---|
| PATENT NO. | : 11,201,870 B2 | |
| APPLICATION NO. | : 17/201897 | |
| DATED | : December 14, 2021 | |
| INVENTOR(S) | : Zheng Liu, Lichun Li and Shan Yin | |

It is certified that error appears in the above-identified patent and that said Letters Patent is hereby corrected as shown below:

On the Title Page

Item (54), replace "PERMISSIONS" with -- PERMISSION --, therefor.

In the Specification

In the title, Column 1, Line 2, replace "PERMISSIONS" with -- PERMISSION --, therefor.

Signed and Sealed this
Twenty-first Day of June, 2022

Katherine Kelly Vidal
*Director of the United States Patent and Trademark Office*